(12) United States Patent
Heino et al.

(10) Patent No.: US 11,089,790 B2
(45) Date of Patent: Aug. 17, 2021

(54) MODIFICATION OF DRY MATTER COMPOSITION AND/OR DRY MATTER CONTENT OF MILK OR CREAM

(71) Applicant: VALIO LTD, Helsinki (FI)

(72) Inventors: Antti Heino, Helsinki (FI); Riitta Partanen, Helsinki (FI)

(73) Assignee: VALIO LTD., Helsinki (FI)

(*) Notice: Subject to any disclaimer, the term of this patent is extended or adjusted under 35 U.S.C. 154(b) by 132 days.

(21) Appl. No.: 16/062,805

(22) PCT Filed: Dec. 15, 2016

(86) PCT No.: PCT/FI2016/050875
§ 371 (c)(1),
(2) Date: Jun. 15, 2018

(87) PCT Pub. No.: WO2017/103334
PCT Pub. Date: Jun. 22, 2017

(65) Prior Publication Data
US 2019/0191731 A1    Jun. 27, 2019

(30) Foreign Application Priority Data
Dec. 16, 2015 (FI) ...................................... 20155957

(51) Int. Cl.
A23C 9/142 (2006.01)
A23C 13/12 (2006.01)
A23C 15/06 (2006.01)

(52) U.S. Cl.
CPC .......... *A23C 9/1422* (2013.01); *A23C 9/1427* (2013.01); *A23C 13/12* (2013.01); *A23C 15/06* (2013.01); *A23C 2210/20* (2013.01); *A23C 2210/206* (2013.01); *A23C 2210/252* (2013.01)

(58) Field of Classification Search
CPC ..... A23C 9/1422; A23C 9/1427; A23C 13/12; A23C 15/06; A23C 2210/20; A23C 2210/206; A23C 2210/252
USPC .......................... 426/580, 581, 586, 490, 491
See application file for complete search history.

(56) References Cited

U.S. PATENT DOCUMENTS

| | | | |
|---|---|---|---|
| 4,140,806 A | 2/1979 | Glimenius et al. | |
| 6,551,648 B1 | 4/2003 | Goudedranche et al. | |
| 7,169,428 B2 * | 1/2007 | Dunker ................ | A23C 9/1512 426/580 |
| 2003/0175399 A1 | 9/2003 | Goudedranche et al. | |
| 2007/0098871 A1 | 5/2007 | Dunker et al. | |
| 2007/0166447 A1 | 7/2007 | Ur-Rehman et al. | |
| 2010/0068293 A1 | 3/2010 | Dalemans et al. | |
| 2014/0017332 A1 * | 1/2014 | Tikanmaki ........... | A23C 9/1206 424/535 |

FOREIGN PATENT DOCUMENTS

| | | |
|---|---|---|
| EP | 0 469 206 | 2/1992 |
| RU | 2012 127 619 | 1/2014 |
| WO | WO 2015/170164 | 11/2015 |

OTHER PUBLICATIONS

International Search Report for PCT/FI2016/050875 dated Mar. 24, 2017, 5 pages.
Written Opinion of the ISA for PCT/FI2016/050875 dated Mar. 24, 2017, 6 pages.
Search Report for FI20155957 dated Jul. 14, 2016, 2 pages.
Morin et al., "Microfiltration of Buttermilk and Washed Cream Buttermilk for Concentration of Milk Fat Globule Membrane Components", *Journal of Dairy Science*, vol. 90, No. 5, May 1, 2007, pp. 2132-2140.
Britten et al., "Effect of cream treatment on phospholipids and protein recovery in butter-making process", *Internal Journal of Food Science & Technology*, vol. 43, No. 4, Apr. 2008, pp. 651-657.
Database GNPD [Online] Mintel; Jul. 2015, "Lactose-Free Butter", XP00276514, 2 pages.
Database GNPD [Online] Mintel; Nov. 2015, "Regular Salted Butter", 2 pages.
Database GNPD [Online] Mintel; Nov. 2015, "Organic Regular Salted Butter", 2 pages.
Office Action issued in RU Appln. No. 2018125894 dated Jun. 25, 2019 (w/ translation).

* cited by examiner

*Primary Examiner* — Leslie A Wong
(74) *Attorney, Agent, or Firm* — Robert P. Michal, Esq.; Carter, DeLuca & Farrell LLP

(57) ABSTRACT

The invention relates to a method of modification of dry matter composition and/or dry matter content of milk, comprising the steps of: providing raw milk having a fat content in the range of about 3% w/w to about 60% w/w; modifying a dry matter composition and/or dry matter content of the raw milk to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk. The invention further relates to a method of production of butter, wherein the milk with the modified dry matter composition and/or dry matter content is churned to provide butter.

27 Claims, 1 Drawing Sheet

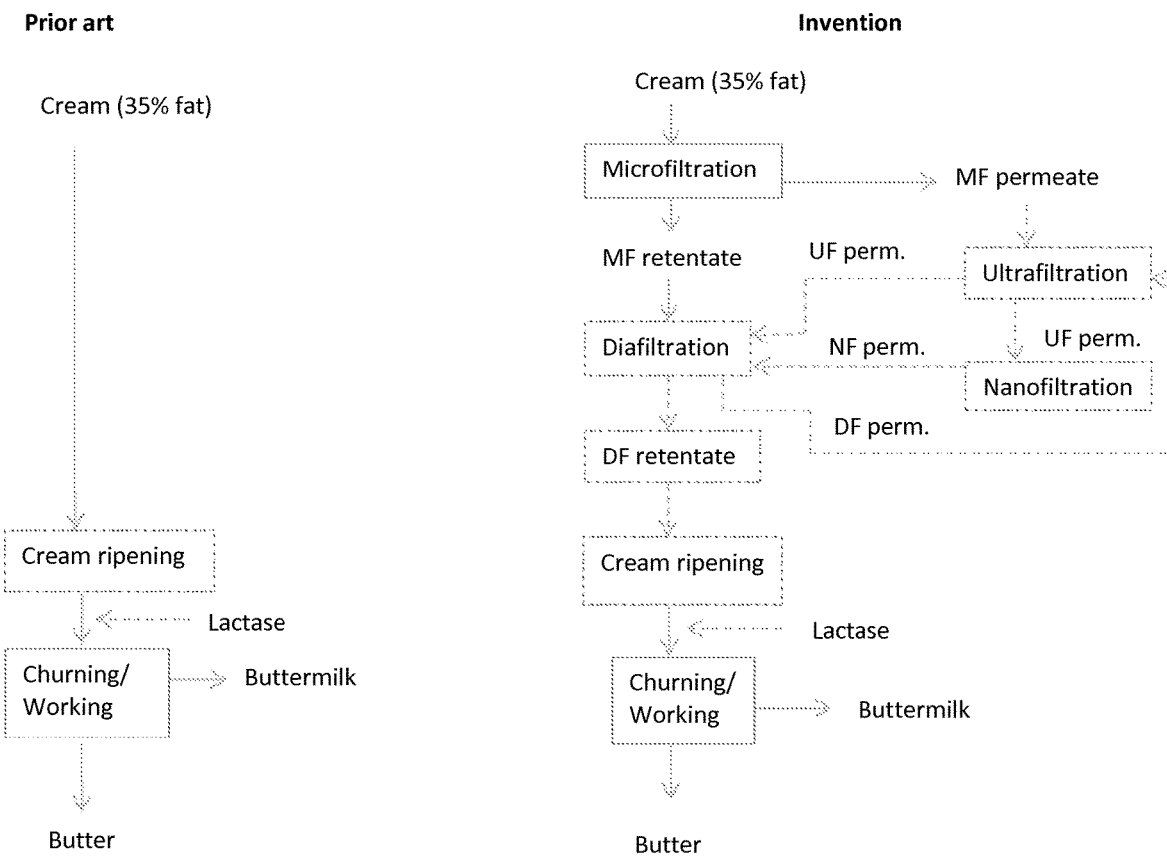

MODIFICATION OF DRY MATTER COMPOSITION AND/OR DRY MATTER CONTENT OF MILK OR CREAM

This application is the U.S. national phase of International Application No. PCT/FI2016/050875 filed Dec. 15, 2016 which designated the U.S. and claims priority to FI Patent Application No. 20155957 filed Dec. 16, 2015, the entire contents of each of which are hereby incorporated by reference.

FIELD OF THE INVENTION

The present invention relates to a method for modification of dry matter composition and/or dry matter content of milk. Milk with modified dry matter composition and/or dry matter content can be utilized in the manufacture of butter.

BACKGROUND OF THE INVENTION

Conventional butter production process comprises the following steps: separation of cream from milk; pasteurization of cream; cream ripening including temperature treatment; churning; and working. In the butter production, half of the cream volume is converted to butter milk. Buttermilk is typically dried to powder and used in the preparation of other dairy products, such as quarks, sour milk and ice cream, but also in animal feed.

Cream separated from milk still contains a quantity of lactose and of protein. Protein is generally a high value component of milk which is desirably recovered from cream separation. When it is desirable to reduce a lactose content of butter, in the current butter production lactase enzyme is introduced to cream prior to churning. Churning/working then produces butter and buttermilk which includes decomposition products of lactose, i.e. monosaccharides, and optionally a minor amount of residual lactose. This low-lactose buttermilk is difficult to utilize in the production of other dairy products due to the presence of monosaccharides, and is thus a low value fraction produced in low-lactose butter production. Drying of the current lactose-free buttermilk is difficult, since the glass-transition temperature of monosaccharides is lower than that of lactose. However, drying of the lactose-free, monosaccharides containing buttermilk is possible when it is first blended with lactose-containing buttermilk.

It is desirable to reduce protein content of cream prior to butter manufacture, since it is difficult to separate proteins from complex lipids present in buttermilk after churning. Casein and complex lipids are attached to each other to some extent during churning. Thus, it is possible to separate casein from cream before churning, since complex lipids are not yet detached from the surface of the fat droplets. Furthermore, when low-lactose butter is desired, it is also desirable to reduce lactose content of cream prior to churning in order to avoid the above problems associated with lactose-free buttermilk.

We have now found a new method in which protein, lactose and/or milk mineral content(s) of raw milk can be reduced without affecting the quality of butter.

BRIEF DESCRIPTION OF THE INVENTION

The invention provides a method in which protein and/or lactose and/or milk minerals are efficiently recovered from raw milk in their native form prior to churning of the raw milk to provide butter and buttermilk.

The invention also provides a method by which the problems related to prior art low-lactose butter milk are avoided. In the present invention, buttermilk with a reduced dry matter content is produced while beneficial complex lipids are concentrated in buttermilk. Here, the term "complex lipid" means a lipid selected from the group consisting of phospholipids and sphingolipids including glycosphingolipids (both cerebrosides and gangliosides), ceramides and sphingomyelins.

Still further, the invention provides a method in which high value by-products, especially protein, are produced as side streams which can be easily further utilized in the production of various dairy products.

The invention also provides an enhanced method for butter production.

The method of the invention further provides low-lactose or lactose-free cream.

An object of the present invention is to provide a method of modification of dry matter composition and/or dry matter content of milk, comprising the steps of:
  providing raw milk having a fat content in the range of about 3% w/w to about 60% w/w,
  modifying a dry matter composition and/or dry matter content of the raw milk to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk.

Another object of the invention is to provide a method of production of butter, comprising the steps of:
  providing raw milk having a fat content in the range of about 3% w/w to about 60% w/w,
  modifying a dry matter composition and/or dry matter content of the raw milk to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk,
  churning the raw milk with modified dry matter composition and/or dry matter content to provide butter.

Still another object of the invention is to provide butter having a protein content of a fat-free portion of the butter of at most about 2.3% (w/w).

BRIEF DESCRIPTION OF THE DRAWINGS

FIG. 1 shows a prior art method and an embodiment of the method of the present invention for producing butter.

DETAILED DESCRIPTION OF THE INVENTION

An object of the present invention is to provide a method of modification of dry matter composition and/or dry matter content of milk, comprising the steps of:
  providing raw milk having a fat content in the range of about 3% w/w to about 60% w/w,
  modifying a dry matter composition and/or dry matter content of the raw milk to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk.

Another object of the invention is to provide a method of production of butter, comprising the steps of:
  providing raw milk having a fat content in the range of about 3% w/w to about 60% w/w,
  modifying a dry matter composition and/or dry matter content of the raw milk to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk,
  churning the raw milk with modified dry matter composition and/or dry matter content to provide butter.

The raw milk used in the methods of the invention can be derived from any animal that produces milk suitable for human consumption, such as cow, sheep, goat, camel, and mare. In an embodiment, the raw milk having a fat content in the range of about 3% w/w to about 60% w/w is full-fat milk. In another embodiment, the raw milk is cream having a fat content in the range of about 35% w/w to about 60% w/w. The cream can be obtained for example by separation of full-fat milk in a conventional manner.

FIG. 1 shows a conventional production of butter starting from cream with a typical fat content of about 35%, and an embodiment of the method of the invention. Dash lines illustrate optional embodiments of the methods.

The raw milk is subjected to a step in which the dry matter composition and/or dry matter content of the raw milk is modified to provide a modified raw milk having a protein content of at most 3% (w/w) and/or carbohydrate content of at most 4% (w/w), based on a fat-free portion of the modified raw milk.

In an embodiment, the raw milk is heat-treated for example by pasteurization at 72° C. for 15 sec prior to the modification step. In another embodiment, no pre-heat treatment of the raw milk is carried out.

The modification of dry matter composition of the raw milk is carried out to reduce the content of protein, either both casein and whey protein, or whey protein only, and/or the content of lactose and/or the content of milk minerals in the raw milk. The term "raw milk with a modified dry matter composition and/or dry matter content" thus means that at least one of the whey protein content, the total protein content, lactose content and milk mineral content of the raw milk is reduced.

In an embodiment, the modification is carried out by using one or more membrane filtration. In an embodiment, the modification is carried out by microfiltration (MF). The pore size of a microfiltration membrane varies in the range of 0.01 µm to about 2.0 µm. In an embodiment, the pore size is about 1.4 µm. Pore size of 1.4 µm allows the penetration of both casein and whey protein through the membrane. In another embodiment, the pore size is <0.3 µm. Membrane with a pore size of <0.3 µm retains casein in the retentate side while whey protein passes through the membrane into the permeate.

The microfiltration is carried out at a temperature of about 1° C. to about 10° C. or at a temperature of about 40° C. to about 55° C. In an embodiment, the microfiltration is carried out at about 40° C. to about 55° C. In another embodiment, the microfiltration is carried out at about 55° C.

The concentration factor in the microfiltration varies in the range of about 1.0 to about 10. In another embodiment, the concentration factor is in the range of about 1.0 to about 1.5. In a further embodiment, the concentration factor is about 10. In a still further embodiment, the concentration factor is about 1.2.

In an embodiment, the microfiltration is carried out with a 1.4 µm membrane by a concentration factor of about 10. In another embodiment, the microfiltration is carried out with a 1.4 µm membrane by a concentration factor of about 1.2.

The separation of proteins, or whey protein, from other milk component by microfiltration can be enhanced by diafiltration. The diafiltration can be carried out continuously or stepwise. In the latter embodiment, one or more diafiltration steps can be employed. In the diafiltration, the microfiltration retentate is diluted with diawater and led again through the same membrane. In an embodiment, the retentate is diluted in an amount which corresponds to that of the permeate produced in the diafiltration. Diawater can be any aqueous medium which is substantially free of protein. When it is desirable also to reduce lactose and/or mineral content of the raw milk, the diawater is conveniently also substantially free of lactose and/or milk minerals, respectively. In an embodiment, the microfiltration permeate is subjected to ultrafiltration (UF) to separate residual protein, or whey protein, of the microfiltration permeate to an ultrafiltration retentate, and lactose and milk minerals to an ultrafiltration permeate. The ultrafiltration can be further subjected to nanofiltration (NF) to separate lactose to a nanofiltration retentate and milk minerals to a nanofiltration permeate. The ultrafiltration permeate is substantially free of protein and can be used as diawater. The nanofiltration permeate is substantially free of protein and lactose and can be used as diawater. Also, tap water can be used as diawater. Further, various diawater media can be combined in appropriate proportions in order to adjust the protein and/or lactose contents of the raw milk to a desired level.

In an embodiment, the modification step of the method of the invention comprises the steps of:
  microfiltration of a raw milk having a fat content in the range of about 3% w/w to about 60% w/w to provide a microfiltration retentate and a microfiltration permeate,
  ultrafiltration of the microfiltration permeate to provide an ultrafiltration retentate and an ultrafiltration permeate,
  diafiltration of the microfiltration retentate by using the ultrafiltration permeate as a diawater to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk.

In another embodiment, the modification step of the method of the invention comprises the steps of:
  microfiltration of a raw milk having a fat content in the range of about 3% w/w to about 60% w/w to provide a microfiltration retentate and a microfiltration permeate,
  ultrafiltration of the microfiltration permeate to provide an ultrafiltration retentate and an ultrafiltration permeate,
  nanofiltration of the ultrafiltration permeate to provide a nanofiltration retentate and a nanofiltration permeate,
  diafiltration of the microfiltration retentate by using the nanofiltration permeate as a diawater to provide a modified raw milk having a fat content in the range of about 35% w/w to about 60% w/w based on the total weight of the modified raw milk, and a protein content of at most 3% (w/w) and/or carbohydrate content of at most 4% (w/w) based on a fat-free portion of the modified raw milk.

Microfiltration combined with diafiltration produces raw milk, in which more than 20%, specifically more than 60% of protein of a fat-free portion of the raw milk is removed.

In another embodiment, the modification of dry matter composition and/or dry matter content of the raw milk is carried out by ultrafiltration. The ultrafiltration is carried out at a temperature of about 5° C. to about 55° C. The cutoff value of an ultrafiltration membrane is about 1 kDa to about 30 kDa. In the ultrafiltration, proteins are retained in the retentate side while lactose and milk minerals pass through the membrane into a permeate.

The ultrafiltration can be combined with diafiltration. Any aqueous medium which is substantially free of lactose can be conveniently used as diawater. Such diawater can be obtained for example so that the ultrafiltration permeate obtained from ultrafiltration of the raw milk is further subjected to nanofiltration in which lactose is retained in the retentate, and a nanofiltration permeate substantially free of lactose is provided. Also tap water is suitable for use as diawater. In this embodiment, the lactose and/or mineral content of the raw milk can be conveniently adjusted while the protein content of the raw milk is substantially retained.

In addition to membrane filtration(s), the modification of dry matter composition and/or dry matter content of the raw milk can be realized by a multistep separation using a centrifugal separator. Various modification methods can be combined in an appropriate manner.

In an embodiment of the methods of the invention, the modification step comprises a step in which the fat content of the raw milk is adjusted to provide cream with a fat content in the range of about 35% w/w to about 60% w/w. In another embodiment, the methods of the invention further comprise a step in which the fat content of the raw milk is adjusted to provide cream with a fat content in the range of about 35% w/w to about 60% w/w.

In an embodiment, the method of the invention provides cream with a reduced lactose content. The cream can be further subjected to a suitable heat treatment, including pasteurization, extended shelf life (ESL) heat treatment, ultra high treatment (UHT), and packed to provide a low-lactose or lactose-free cream ready for consumption.

In an embodiment, the raw milk, such as cream, with the modified dry matter composition and/or dry matter content is high pasteurized at about 85° C. for about 15 sec for butter production. The high heat treatment is performed to destroy/inactivate peroxidase and lipase enzymes and various bacteria, yeast and moulds present in the raw milk. After high pasteurization, the raw milk is optionally ripened. Ripening is typically carried out at about 10° C. for 10 to 16 hours.

Raw milk with the modified dry matter composition and/or dry matter content, optionally heat-treated and/or ripened, is next churned or agitated vigorously or turned over repeatedly or shaked up. Churning is carried out in a manner known per se. Butter and buttermilk with reduced protein, lactose and/or mineral contents are obtained. More specifically, at least about 20% of protein can be removed compared with buttermilk from conventional butter production. Protein can be reduced even up to about 80%. The lactose content of buttermilk can be reduced up to about 90% compared with conventional butter milk.

The buttermilk produced in the invention advantageously contains beneficial complex lipids, defined above, concentrated on dry matter basis which can be further used in functional dairy products.

The method of the invention provides butter in which the protein content of a fat-free portion of the butter is at most about 2.3% (w/w). In an embodiment, the carbohydrate content of a fat-free portion of the butter is at most 4% (w/w). In another embodiment, the mineral content of a fat-free portion of the butter is at most about 0.8% (w/w). In a further embodiment, the casein content of a fat-free portion of the butter is at most about 1.8% (w/w). In a still further embodiment, the whey protein content of a fat-free portion of the butter is at most about 0.5% (w/w).

Still another object of the invention is to provide butter in which the protein content of a fat-free portion of the butter is at most about 2.3% (w/w). In an embodiment, the carbohydrate content of a fat-free portion of the butter is at most 4% (w/w). In another embodiment, the mineral content of a fat-free portion of the butter is at most about 0.8% (w/w). In a further embodiment, the casein content of a fat-free portion of the butter is at most about 1.8% (w/w). In a still further embodiment, the whey protein content of a fat-free portion of the butter is at most about 0.5% (w/w).

In an embodiment, the butter of the invention has a carbohydrate content of at most about 1% (w/w) based on total weight of the butter. In another embodiment, the carbohydrate content is at most about 0.01% (w/w).

The following examples are presented for further illustration of the invention without limiting the invention thereto.

EXAMPLES

Reference Example 1

Cream with a fat content of 36% was obtained from full-fat milk by centrifugal separation (Centrifugal Separator, Frau spa Model CN2A). 20 kg of the cream was processed to butter in a conventional manner illustrated in FIG. 1 ("prior art") without addition of lactase.

The composition of the cream, butter and buttermilk obtained are shown in Table 1.

TABLE 1

|  | Cream | Butter | Buttermilk |
| --- | --- | --- | --- |
| Protein (%) | 2.17 | 0.71 | 3.34 |
| Casein (%) | 1.59 | — | 2.49 |
| Fat (%) | 36 | 78.3 | 1.24 |
| Lactose (%) | 3.12 | 0.99 | 4.58 |
| Ash (%) | 0.47 | 0.4 | 0.75 |
| Dry matter (%) | 42 | 80.8 | 10.3 |
| Protein/fat | 0.060 | 0.009 | 2.69 |
| Lactose/fat | 0.087 | 0.013 | 3.69 |
| Protein/fat-free portion | 3.4 | 3.3 | 3.4 |
| Carbohydr./fat-free portion | 4.9 | 4.6 | 4.7 |

Example 1. Butter Production from Whole Milk Using Microfiltration

Pasteurized (72° C., 15 sec) unhomogenized whole milk is microfiltered using a membrane with a pore size of 1.4 μm at a temperature of about 55° C. In the microfiltration, fat is concentrated to a retentate while proteins, lactose and minerals pass through the membrane to a permeate. Microfiltration is carried out with a concentration factor of about 10.

The cream fraction obtained as a microfiltration retentate is high heat-treated at 90° C. for 20 sec and then ripened at 10° C. for 16 hours. The ripened cream is churned to provide butter and buttermilk.

The composition of the whole milk, microfiltration retentate, butter and buttermilk are shown in Table 2.

TABLE 2

|  | Whole milk | Cream (MF retentate) | Butter | Buttermilk |
|---|---|---|---|---|
| Protein (%) | 3.2 | 1.29 | 0.48 | 2 |
| Casein (%) | 2.6 | 0.83 | — | 1.27 |
| Fat (%) | 3.5 | 37.3 | 78.9 | 0.97 |
| Lactose (%) | 4.6 | 2.44 | 0.79 | 3.53 |
| Ash (%) | 0.7 | 0.35 | 0.31 | 0.6 |
| Dry matter (%) | 12.0 | 42 | 80.8 | 7.4 |
| Protein/fat | 0.814 | 0.035 | 0.006 | 2.06 |
| Lactose/fat | 1.116 | 0.065 | 0.010 | 3.64 |
| Protein/fat-free portion | 3.3 | 2.1 | 2.3 | 2.0 |
| Carbohydr./fat-free portion | 4.8 | 3.9 | 3.7 | 3.6 |

The results of Table 2 show that both lactose and protein contents of butter and buttermilk can be reduced by using microfiltration compared with butter and buttermilk prepared by conventional butter production process.

Example 2. Butter Production from Cream Using Microfiltration and Diafiltration Pasteurized (72° C., 15 sec) unhomogenized cream raw material having a fat content of 36% is microfiltered using a membrane with a pore size of 1.4 μm at a temperature of about 55° C. In the microfiltration, fat is concentrated to a retentate while proteins, lactose and minerals pass through the membrane to a permeate. Microfiltration is carried out with a concentration factor of about 1.2.

The microfiltration permeate is further ultrafiltered to separate proteins to an ultrafiltration retentate, and lactose and minerals to an ultrafiltration permeate. Ultrafiltration is carried out at a temperature of about 55° C. with a concentration factor of about 6.

The microfiltration of the cream raw material was continued with diafiltration where the microfiltration retentate is diluted with the above ultrafiltration permeate. The retentate is diluted with the ultrafiltration permeate in an amount which corresponds to the amount of the permeate formed in the diafiltration.

Cream with modified dry matter composition and/or dry matter content obtained above as a diafiltration retentate is pasteurized at 85° C. for 15 sec and then ripened at 10° C. for 16 hours. Cream is then churned to produce butter and buttermilk with reduced protein contents. Especially, more than 60% of protein in buttermilk can be removed compared with that of buttermilk prepared in accordance with conventional butter production.

Table 3 shows the composition of the cream raw material and of the various fractions obtained in the method of the invention.

TABLE 3

|  | Cream raw material | MF/DF retentate | Butter | Buttermilk |
|---|---|---|---|---|
| Protein (%) | 2.17 | 0.78 | 0.31 | 1.1 |
| Casein (%) | 1.59 | 0.51 | — | 0.72 |
| Fat (%) | 36 | 33.3 | 75.5 | 0.98 |
| Lactose (%) | 3.12 | 2.81 | 0.98 | 3.72 |
| Ash (%) | 0.47 | 0.39 | 0.42 | 0.57 |
| Dry matter (%) | 42 | 37.7 | 77.3 | 6.95 |
| Protein/fat | 0.060 | 0.023 | 0.004 | 1.12 |
| Lactose/fat | 0.087 | 0.084 | 0.013 | 3.80 |
| Protein/fat-free portion | 3.4 | 1.2 | 1.3 | 1.1 |
| Carbohydr./fat-free portion | 4.9 | 4.2 | 4.0 | 3.8 |

Table 3 shows that the protein content of butter and buttermilk can be efficiently reduced by using microfiltration and diafiltration, and lactose and milk minerals can be returned to the butter.

Table 4 shows a comparison of a protein content of butter and buttermilk prepared in this Example and of those obtained with prior art method of reference example 1.

TABLE 4

| Protein content | Method of invention | Prior art method |
|---|---|---|
| Cream (g/kg) | 22 | 22 |
| MF permeate (g/kg) | 11 | — |
| Butter (g/kg) | 1 | 2 |
| Butter milk (g/kg) | 7 | 18 |

Table 4 shows that less protein is desirably retained in butter prepared with the present invention compared with prior art butter.

It will be obvious to a person skilled in the art that, as the technology advances, the inventive concept can be implemented in various ways. The invention and its embodiments are not limited to the examples described above but may vary within the scope of the claims.

The invention claimed is:

1. A method of modification of dry matter composition of milk, comprising the steps of:
    providing raw milk having a fat content in the range of about 3% w/w to about 60% w/w,
    modifying a dry matter composition of the raw milk by microfiltration combined with diafiltration using an aqueous solution substantially free of protein as diawater, to provide a modified raw milk having a fat content in the range of about 35% w/w to about 60% w/w based on the total weight of the modified raw milk, and at least one of a protein content of at most 3% (w/w) and carbohydrate content of at most 4% (w/w) based on a fat-free portion of the modified raw milk.

2. A method of production of butter, comprising the steps of:
    providing raw milk having a fat content in the range of about 3% w/w to about 60% w/w,
    modifying a dry matter composition of the raw milk by microfiltration combined with diafiltration using an aqueous solution substantially free of protein as diawater, to provide a modified raw milk having a fat content in the range of about 35% w/w to about 60% w/w based on the total weight of the modified raw milk, and at least one of a protein content of at most 3% (w/w) and carbohydrate content of at most 4% (w/w) based on a fat-free portion of the modified raw milk,
    churning the modified raw milk to provide butter.

3. The method of claim 1, wherein the raw milk is cream having a fat content in the range of about 35% w/w to about 60% w/w.

4. The method of claim 1, wherein a pore size of a microfiltration membrane used in the microfiltration is about 0.01 µm to about 2.0 µm.

5. The method of claim 1, wherein the microfiltration is carried out at a temperature of about 1° C. to about 10° C. or at a temperature of about 40° C. to about 55° C.

6. The method of claim 1, wherein a concentration factor of the microfiltration is in the range of about 1.0 to about 10.

7. The method of claim 1, wherein the aqueous solution is substantially free of at least one of lactose and minerals.

8. The method of claim 1, wherein the modification comprises the steps of:
microfiltration of the raw milk to provide a microfiltration retentate and a microfiltration permeate,
ultrafiltration of the microfiltration permeate to provide an ultrafiltration retentate and an ultrafiltration permeate,
diafiltration of the microfiltration retentate by using the ultrafiltration permeate as a diawater to provide the modified raw milk.

9. The method of claim 1, wherein the modification comprises the steps of:
microfiltration of the raw milk to provide a microfiltration retentate and microfiltration permeate,
ultrafiltration of the microfiltration permeate to provide an ultrafiltration retentate and an ultrafiltration permeate,
nanofiltration of the ultrafiltration permeate to provide a nanofiltration retentate and a nanofiltration permeate,
diafiltration of the microfiltration retentate by using the nanofiltration permeate as a diawater to provide the modified raw milk.

10. The method of claim 2, wherein the modified raw milk is high heat-treated at conditions comprising a high pasteurization at about 85° C. for about 15 sec and ripened at about 10° C. for 10 to 16 hours.

11. The method of claim 2, wherein the protein content of a fat-free portion of the butter is at most about 2.3% (w/w).

12. The method of claim 2, wherein the carbohydrate content of a fat-free portion of the butter is at most 4% (w/w).

13. The method of claim 1, wherein a pore size of a microfiltration membrane used in the microfiltration is <0.3 µm or 1.4 µm.

14. The method of claim 1, wherein the microfiltration is carried out at a temperature of about 40 C to about 55° C.

15. The method of claim 1, wherein the microfiltration is carried out at a temperature of about 55° C.

16. The method of claim 1, wherein a concentration factor of the microfiltration is in the range of about 1.0 to about 1.5.

17. The method of claim 1, wherein a concentration factor of the microfiltration is about 10 or about 1.2.

18. The method of claim 2, wherein the raw milk is cream having a fat content in the range of about 35% w/w to about 60% w/w.

19. The method of claim 2, wherein a pore size of a microfiltration membrane used in the microfiltration is about 0.01 µm to about 2.0 µm.

20. The method of claim 2, wherein a pore size of a microfiltration membrane used in the microfiltration is <0.3 µm or 1.4 µm.

21. The method of claim 2, wherein the microfiltration is carried out at a temperature of about 1° C. to about 10° C. or at a temperature of about 40° C. to about 55° C.

22. The method of claim 2, wherein the microfiltration is carried out at a temperature of about 55° C.

23. The method of claim 2, wherein a concentration factor of the microfiltration is in the range of about 1.0 to about 1.5.

24. The method of claim 2, wherein a concentration factor of the microfiltration is about 10 or about 1.2.

25. The method of claim 2, wherein the aqueous solution is substantially free of at least one of lactose and minerals.

26. The method of claim 2, wherein the modification comprises the steps of:
microfiltration of the raw milk to provide a microfiltration retentate and a microfiltration permeate,
ultrafiltration of the microfiltration permeate to provide an ultrafiltration retentate and an ultrafiltration permeate,
diafiltration of the microfiltration retentate by using the ultrafiltration permeate as a diawater to provide the modified raw milk.

27. The method of claim 2, wherein the modification comprises the steps of:
microfiltration of the raw milk to provide a microfiltration retentate and a microfiltration permeate,
ultrafiltration of the microfiltration permeate to provide an ultrafiltration retentate and an ultrafiltration permeate,
nanofiltration of the ultrafiltration permeate to provide a nanofiltration retentate and a nanofiltration permeate,
diafiltration of the microfiltration retentate by using the nanofiltration permeate as a diawater to provide the modified raw milk.

* * * * *